US011451041B2

(12) United States Patent
Urbano, Jr.

(10) Patent No.: US 11,451,041 B2
(45) Date of Patent: Sep. 20, 2022

(54) SERVICE ENTRANCE CABLE SEALING ARTICLE

(71) Applicant: Peter A Urbano, Jr., Sewell, NJ (US)

(72) Inventor: Peter A Urbano, Jr., Sewell, NJ (US)

(*) Notice: Subject to any disclaimer, the term of this patent is extended or adjusted under 35 U.S.C. 154(b) by 0 days.

(21) Appl. No.: 16/674,588

(22) Filed: Nov. 5, 2019

(65) Prior Publication Data

US 2022/0069559 A1 Mar. 3, 2022

(51) Int. Cl.
*H02G 15/113* (2006.01)
*H02G 15/013* (2006.01)
*H02G 3/08* (2006.01)
*H02G 15/117* (2006.01)

(52) U.S. Cl.
CPC .......... *H02G 15/013* (2013.01); *H02G 3/083* (2013.01); *H02G 3/088* (2013.01); *H02G 15/117* (2013.01)

(58) Field of Classification Search
CPC .................................................. H02G 15/113
USPC ........................................................... 174/92
See application file for complete search history.

(56) References Cited

U.S. PATENT DOCUMENTS

| 2,962,542 | A | * | 11/1960 | Witt | H02G 15/113 |
| | | | | | 174/76 |
| 3,746,777 | A | * | 7/1973 | Peek | H01R 4/186 |
| | | | | | 174/94 R |
| 5,198,619 | A | * | 3/1993 | Baker | H02G 15/046 |
| | | | | | 174/74 A |
| 5,796,041 | A | * | 8/1998 | Suzuki | H02G 15/18 |
| | | | | | 174/92 |
| 8,408,929 | B2 | * | 4/2013 | Solon | H01R 13/639 |
| | | | | | 439/301 |

* cited by examiner

*Primary Examiner* — Chau N Nguyen
(74) *Attorney, Agent, or Firm* — Troutman Pepper Hamilton Sanders LLP

(57) ABSTRACT

A cable sealing article has first and second sections, each section having a top wall, a bottom wall, and side walls. The top wall of each section has a plurality of cut-out openings shaped to partially circumscribe one of the plurality of electrical core wire conductors of the service entrance cable. The bottom wall of each section has a single cut-out opening. Each section also has an interior cavity located between the top, bottom, and side walls. In its use position, the article is configured to encapsulate the core wire connectors of the service entrance cable at their meter panel entry location. One of the two sections has a port opening in which silicone material is injected to fill the interior cavities of the first and second sections, thereby providing a waterproof seal to the service entrance cable as it enters the meter panel.

2 Claims, 4 Drawing Sheets

SERVICE ENTRANCE CABLE SEALING ARTICLE

FIELD OF THE INVENTION

The present invention relates to a cable sealing article for sealing a service entrance cable from water which would otherwise cause damage to and within the electrical meter panel into which the cable is connected.

BACKGROUND OF THE INVENTION

A service entrance cable is routinely utilized to conduct electricity to electric meters which are housed in electric meter panels. These cables generally consist of protective sheaths covering a plurality, usually three, of electrical core wire conductors which are connected to the electric meters in the panel. When the protective sheath of a service entrance cable surrounding the wire conductors is removed at the location at which the conductors enter the electrical meter panel, this location is exposed to the elements, primarily to water which will often accumulate in this area. It is thus imperative that the wire conductors are fully sealed and waterproofed at these meter panel entry locations, in order to protect the service entrance cable and electrical components inside the panel.

Currently, the sealing and waterproofing of service entrance cables entering an electric meter panel is accomplished by randomly applying silicone material around the area where the electrical core wire conductors extend out from the cable, at their entry location into the panel. This not only results in a sloppy, glob-like appearance around the wire conductors, but also causes an undue waste of silicone material. Most importantly, such a slip-shod, inexact sealing process does not guarantee that there will be a complete watertight seal.

SUMMARY OF THE INVENTION

It is thus the object of the present invention to provide a service entrance cable sealing article which addresses the limitations and disadvantages of prior means of providing a waterproof seal for a service entrance cable connection to electric meter panels.

This and other objects are accomplished by the present invention, a cable sealing article having first and second sections, each section having a top wall, a bottom wall, and side walls. The top wall of each section has a plurality of cut-out openings shaped to partially circumscribe one of the plurality of electrical core wire conductors of the service entrance cable. The bottom wall of each section has a single cut-out opening. Each section also has an interior cavity located between the top, bottom, and side walls. In its use position, the article is configured to encapsulate the core wire connectors of the service entrance cable at their meter panel entry location. One of the two sections has a port opening in which silicone material is injected to fill the interior cavities of the first and second sections, thereby providing a waterproof seal to the service entrance cable as it enters the meter panel.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
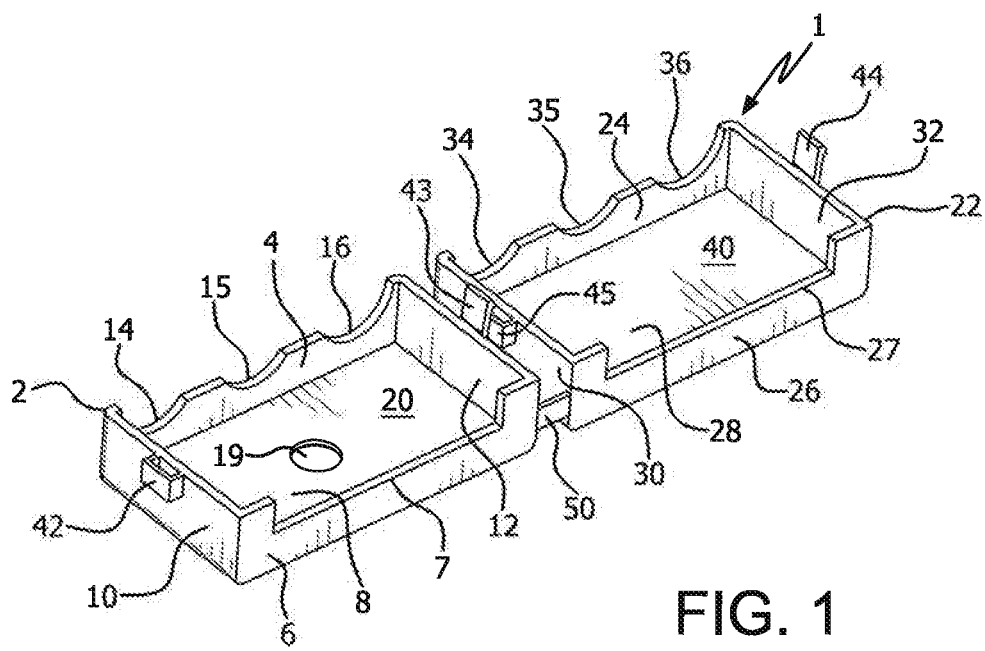
FIG. 1 is a perspective view of the cable sealing article of the present invention in its first or open position.
Figure 2:
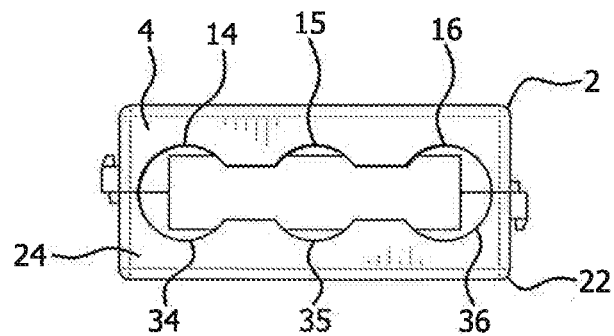
FIG. 2 is a top view of the cable sealing article of the present invention in its second or closed position in which it encapsulates the electrical core wire conductors of a service entrance cable.
Figure 3:
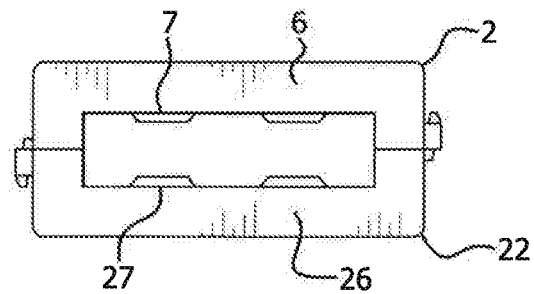
FIG. 3 is a bottom view of the cable sealing article of the present invention in its second or closed position.
Figure 4:
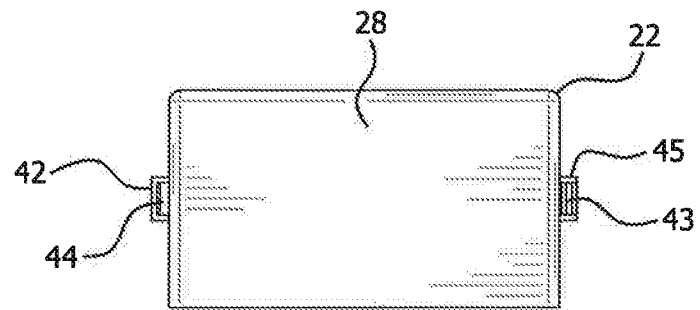
FIG. 4 shows a rear view of the cable sealing article of the present invention in its second or closed position.
Figure 5:
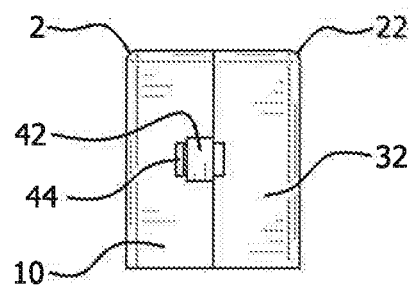
FIG. 5 is an elevation view of the cable sealing article of the present invention in its second or closed position.
Figure 6:
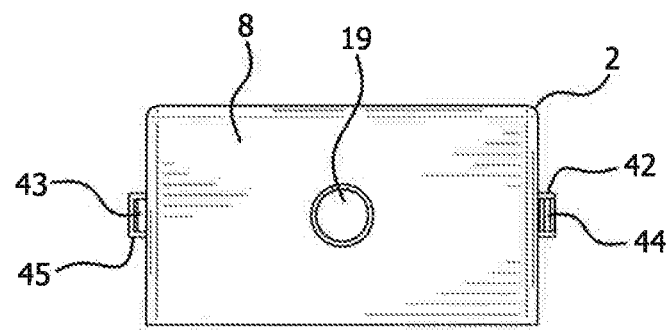
FIG. 6 is a front view of the first section of the cable sealing article of the present invention in its second or closed position.

Cable sealing article 1 comprises first section 2 and second section 22. In its first, or open position, prior to article 1 being used, the first and second sections are interconnected by removeable tab 50, as seen in FIG. 1.

First section 2 comprises top wall 4 with cut-out openings 14, 15, and 16, bottom wall 6 with single cut-out opening 7, back wall 8, and side walls 10 and 12. Cut-out openings 14, 15, and 16 are shaped to partially circumscribe electrical core wire conductors 62, 64, and 66 of service entrance cable 60. Port 19 extends through back wall 8. Interior cavity 20 is located between top wall 4, bottom wall 6, and side walls 10 and 12.

Second section 22 comprises top wall 24 with cut-out openings 34, 35, and 36, bottom wall 26 with single cut-out opening 27, back wall 28, and side walls 30 and 32. Cut-out openings 34, 35, and 36 are shaped to partially circumscribe electrical core wire conducts 62, 64, and 66 of service entrance cable 60. Interior cavity 40 is located between top wall 24, bottom wall 26, and side walls 30 and 32.

Connection means takes the form of clasp attachments 42 and 43 extending from side walls 10 and 12 of first section 2, and clasp attachments 44 and 45 extending from side walls 30 and 32 of second section 24.

Figure 7:
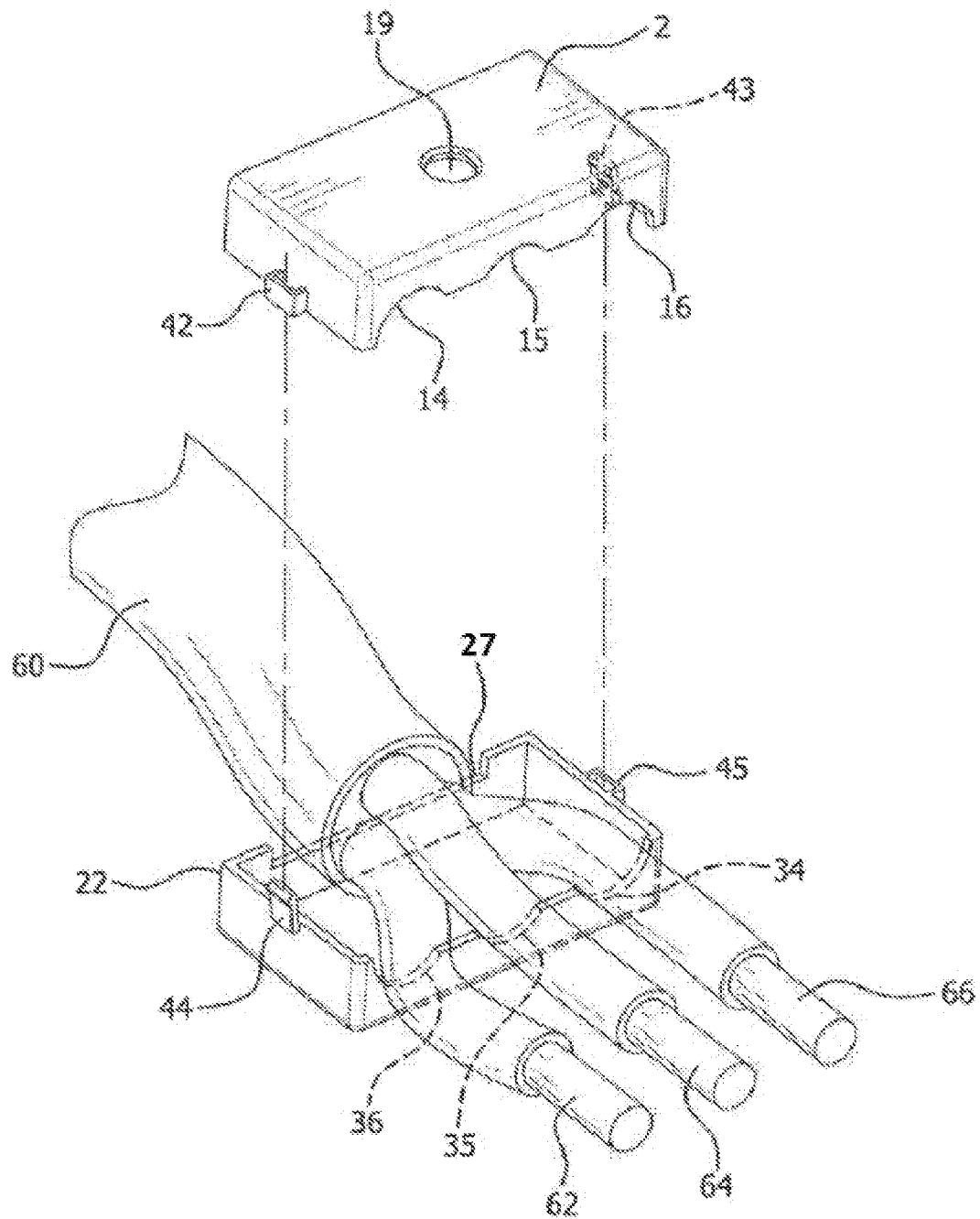
FIG. 7 illustrates the positioning of a service entrance cable with its electrical core wire conductors positioned within the cable sealing article of the present invention, with the core wire connectors about to be encapsulated within the article.
Figure 8:
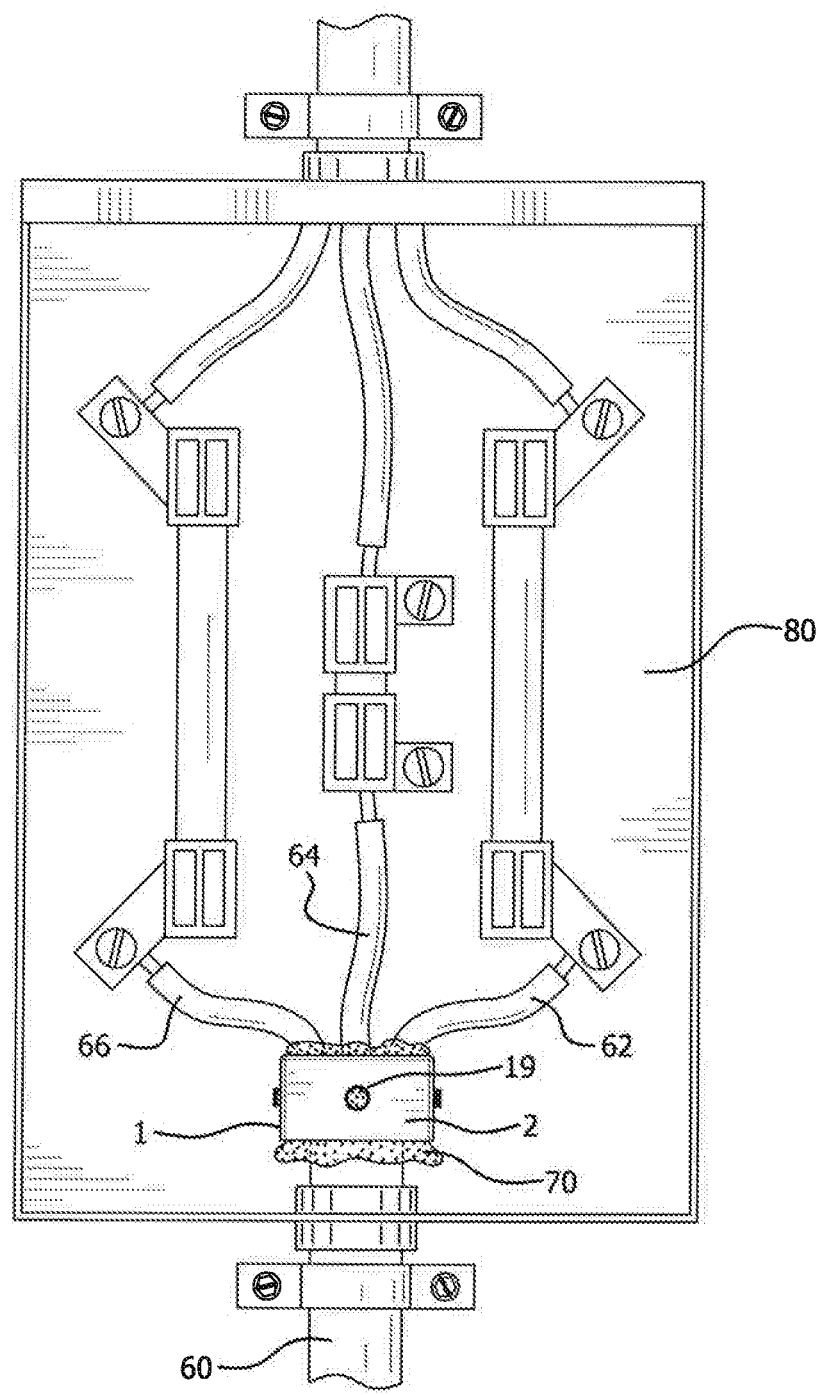
FIG. 8 shows the cable sealing article of the present invention in place, providing a waterproof seal for the service entrance cable entering into and connected to an electric meter panel.

In use, from the first position, first section 2 is detached from second section 22 by removing tab 50. Electrical core wire conductors 62, 64, and 66 of service entrance cable 60 entering electric meter panel 80 are positioned in cut-out sections 27, 34, 35, and 36 of second section 22, as best seen in FIG. 7. First section 2 is then positioned over the core wire conductors, such that cut-out sections 7, 14, 15, and 16 are positioned on and partially circumscribe the core wire conductors. After first section 2 is positioned over second section 22 in the second or closed position, clasp attachments 42 and 44 and 43 and 45 are engaged to connect sections 2 and 22 to fully encapsulate core wire conductors 62, 64 and 66 within the first and second sections of cable sealing article 1. Silicone material 70 is then injected into port 19, such that the silicone material fills interior cavities 20 and 40 of sections 2 and 22. Excess silicone material 70 is permitted to seep from the interior cavities, as seen in FIG. 8.

This, by utilizing cable sealing article 1, an effective waterproof seal is provided to electrical core wire conductors 62, 64, and 66 of service entrance cable 60, at the location at which the core wire conductors enter electric meter panel 80.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A cable sealing article for providing a waterproof seal to a service entrance cable containing a plurality of electrical core wire conductors, said article comprising:
    a first section comprising a top wall, a bottom wall, and side walls, the top wall having a plurality of cut-out openings, each of the plurality of cut-out openings being shaped to partially circumscribe one of the plurality of core wire conductors of the service entrance cable, the bottom wall having a single cut-out opening, and an interior cavity located between the top wall, the bottom wall, and the side walls;
    a second section comprising a top wall, a bottom wall, and side walls, the top wall having a plurality of cut-out openings, each of the plurality of cut-out openings being shaped to partially circumscribe the plurality of electrical wire conductors of the service entrance cable, the bottom wall having a single cut-out opening, and an interior cavity located between the top wall, the bottom wall, and the side walls; and
    a removeable tab connecting the first and second sections, wherein the removeable tab is attached to at least one of the side walls of the first section and to at least one of the side walls of the second section; and
    a connection means for attaching the first and second sections in the second position, the connection means located on the side walls of the first section and the side walls of the second section,
        wherein in a first position the first and second sections are interconnected by the tab, and in a second position, the first and second sections are disconnected and they overlay each other with one of the plurality of electrical wire conductors in one of the plurality of cut-out openings of each section, the wire conductors extending through the interior cavity and exiting the plurality of cut-out openings of the first and second sections and wherein the article is configured such that it cannot be in the second position when the removeable tab is connected to both the first section and the second section.

2. A cable sealing article for providing a waterproof seal to a service entrance cable containing a plurality of electrical core wire conductors, said article comprising:
    a first section comprising a top wall, a bottom wall, and side walls, the top wall having a plurality of cut-out openings, each of the plurality of cut-out openings being shaped to partially circumscribe one of the plurality of core wire conductors of the service entrance cable, the bottom wall having a single cut-out opening, and an interior cavity located between the top wall, the bottom wall, and the side walls;
    a second section comprising a top wall, a bottom wall, and side walls, the top wall having a plurality of cut-out openings, each of the plurality of cut-out openings being shaped to partially circumscribe the plurality of electrical wire conductors of the service entrance cable, the bottom wall having a single cut-out opening, and an interior cavity located between the top wall, the bottom wall, and the side walls;
    a removeable tab connecting the first and second sections, wherein the removeable tab is attached to at least one of the side walls of the first section and to at least one of the side walls of the second section;
    a through port means in the first section for receiving silicone material and for filling the interior cavities of the first and second sections with said silicone material; and
    a connection means for attaching the first and second sections in the second position, the connection means located on the side walls of the first section and the side walls of the second section,
    wherein in a first position the first and second sections are interconnected by the tab, and in a second position, the first and second sections are disconnected and they overlay each other with one of the plurality of electrical wire conductors in one of the plurality of cut-out openings of each section, the wire conductors extending through the interior cavity and exiting the plurality of cut-out openings of the first and second sections and wherein the article is configured such that it cannot be in the second position when the removeable tab is connected to both the first section and the second section.

\* \* \* \* \*